(12) United States Patent
Akechi

(10) Patent No.: US 9,732,465 B2
(45) Date of Patent: Aug. 15, 2017

(54) COATED FABRIC FOR AIR BAG AND METHOD FOR MANUFACTURING THE SAME

(71) Applicant: Toyobo Co., Ltd., Osaka (JP)

(72) Inventor: Tsutomu Akechi, Shiga (JP)

(73) Assignee: Toyobo Co., Ltd., Osaka (JP)

( * ) Notice: Subject to any disclaimer, the term of this patent is extended or adjusted under 35 U.S.C. 154(b) by 150 days.

(21) Appl. No.: 14/426,831

(22) PCT Filed: Sep. 19, 2013

(86) PCT No.: PCT/JP2013/075251
§ 371 (c)(1),
(2) Date: Mar. 9, 2015

(87) PCT Pub. No.: WO2014/046159
PCT Pub. Date: Mar. 27, 2014

(65) Prior Publication Data
US 2015/0247283 A1 Sep. 3, 2015

(30) Foreign Application Priority Data

Sep. 20, 2012 (JP) .................................. 2012-206782

(51) Int. Cl.
*B60R 21/235* (2006.01)
*D06N 3/12* (2006.01)
(Continued)

(52) U.S. Cl.
CPC ............ *D06N 3/128* (2013.01); *B60R 21/235* (2013.01); *D03D 1/02* (2013.01); *D06N 3/007* (2013.01);
(Continued)

(58) Field of Classification Search
CPC ............ D06N 2211/268; D06N 3/0006; D06N 3/128; B60R 21/235; D10B 2401/04; D10B 2505/124
(Continued)

(56) References Cited

U.S. PATENT DOCUMENTS 7,309,666 B2 * 12/2007 Ishii ...................... B60R 21/235
427/387
2007/0031621 A1 * 2/2007 Morimoto ............. B60R 21/235
428/36.1
(Continued)

FOREIGN PATENT DOCUMENTS

JP    6-277607        10/1994
JP    2003-171843     6/2003
(Continued)

OTHER PUBLICATIONS http://www.engineering-dictionary.org/Materials-Science-and-Engineering-Dictionary/foam. copyright date 2008.*
(Continued)

*Primary Examiner* — Arti Singh-Pandey
(74) *Attorney, Agent, or Firm* — Fish & Richardson P.C.

(57) ABSTRACT

The present invention relates to a coated fabric for an air bag obtained by applying an elastomer resin onto at least one side of a woven fabric made from synthetic fiber. The applied amount of the elastomer resin is 25 to 60 g/m$^2$. The average resin thickness on warp and weft at head top of the woven fabric surface is 8 μm to 45 μm. The number of foams having diameter of 30 μm or larger is 100 or more/cm$^2$ on the surface of a resin layer.

7 Claims, 2 Drawing Sheets

(51) Int. Cl.
    *D03D 1/02*         (2006.01)
    *B60R 21/231*           (2011.01)
    *D06N 3/00*             (2006.01)

(52) U.S. Cl.
    CPC .. *D06N 3/0043* (2013.01); *B60R 2021/23123* (2013.01); *B60R 2021/23514* (2013.01); *B60R 2021/23533* (2013.01); *D06N 3/0006* (2013.01); *D06N 3/0047* (2013.01); *D06N 2203/066* (2013.01); *D06N 2205/04* (2013.01); *D06N 2207/00* (2013.01); *D06N 2209/06* (2013.01); *D06N 2209/065* (2013.01); *D06N 2211/268* (2013.01); *D10B 2401/04* (2013.01); *D10B 2505/124* (2013.01); *Y10T 442/2008* (2015.04); *Y10T 442/2631* (2015.04)

(58) Field of Classification Search
    USPC .............................. 427/532; 442/60, 76, 136
    See application file for complete search history.

(56) References Cited

U.S. PATENT DOCUMENTS

2012/0015573 A1* 1/2012 Akechi .................... D03D 1/02
                                                            442/59
2012/0052758 A1  3/2012 Peschko et al.
2013/0189887 A1* 7/2013 Akechi .................... D03D 1/02
                                                            442/60

FOREIGN PATENT DOCUMENTS

| | | | |
|---|---|---|---|
| JP | 2006-063491 | 3/2006 | |
| JP | 2008-002003 | 1/2008 | |
| JP | 2010-254107 | 11/2010 | |
| JP | 2011-174216 | 9/2011 | |
| JP | 2012-97366 | 5/2012 | |
| JP | 2012-526164 | 10/2012 | |
| WO | WO 2012/056954 | * 3/2012 | ........... D06M 15/643 |

OTHER PUBLICATIONS http://www.merriam-webster.com/dictionary/foam—no date given.*
Japanese Patent Office, International Search Report for PCT/JP2013/075251 dated Dec. 3, 2013 (with English translation).
Extended European Search Report mailed in corresponding EP Application No. 13838671.9 (dated Apr. 22, 2016).

* cited by examiner

[Fig. 1]
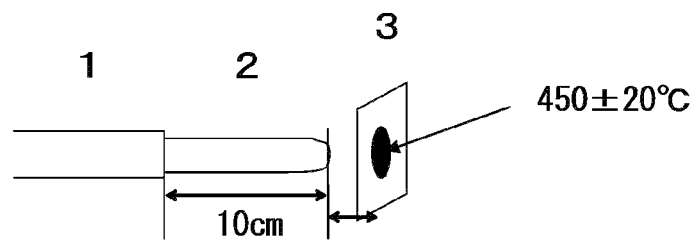
[Fig. 2]
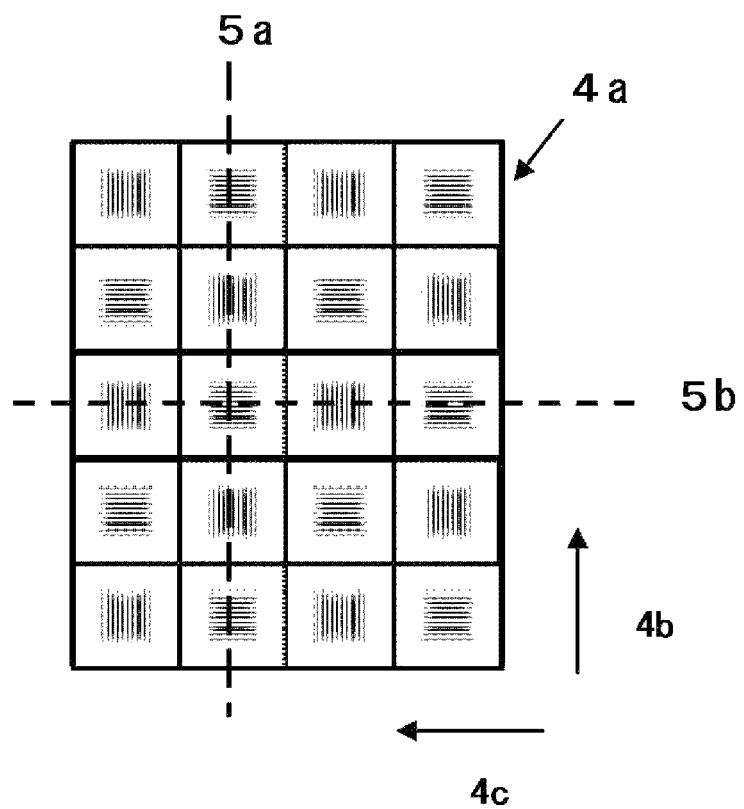

[Fig. 3]
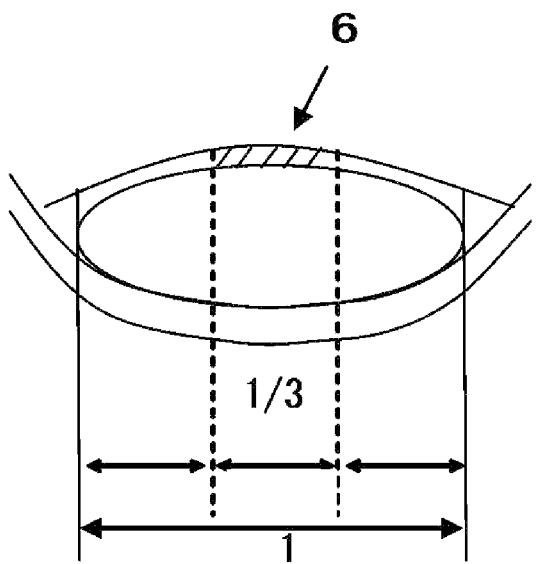

COATED FABRIC FOR AIR BAG AND METHOD FOR MANUFACTURING THE SAME

TECHNICAL FIELD OF THE INVENTION

The present invention relates to coated fabric used for an air bag for automobiles. More particularly, it relates to a coated fabric used for an air bag which exhibits excellent heat resistance and which prevents blocking property caused by contact between coated surfaces.

BACKGROUND ART

In automobiles equipped with an air bag, a sensor perceives shock upon collision and operates to generate gas of high temperature and high pressure. Then, the air bag is instantly developed by the gas whereby human bodies or, particularly, faces and foreheads heads of a driver and a passenger are protected during collision. In recent years, an air bag for automobiles has been widely diffused as one of safety equipments and there has been a progress in its practical utilizations not only for seats for a driver's seat and a passenger seat but also for knee bag, side bag, curtain air bag, etc. Accordingly, automobiles in which a plurality of air bags are installed as a standard equipment have been increasing.

As regions and numbers of the installed air bags are increasing, there has been an increasing demand for making weight and size of an air bag system lighter and more compact and, each of the parts of the system has been designed with a target of making its weight lighter and its size more compact. As a result of such a background, a bag body for an air bag has been also investigated for making its weight light by means of reducing a bag volume and of making the base fabric to be used therefor non-coating.

There are many kinds of types for an inflator which inflates an air bag. In such a view that making its size and weight small and light, respectively is possible, use of a pyro-inflator has been rapidly increasing in recent years. However, the pyro-inflator has such a characteristic that incompletely combusted components generated from a gas generator and floating fine particles due to the residue after combustion of explosives are too much whereby the thermal affection thereby to an air bag tends to be big. With regard to a base fabric used for main body of an air bag, it goes without saying that there is a demand for high heat resistance. In addition, with regard to a heat-resistant reinforcing fabric used for an inflator attachment port, there is also a demand for high heat resistance.

Up to now, waste pieces after cutting a fabric for main body of an airbag have been used as a reinforcing fabric. However, as the weight of a fabric for the main body becomes light, heat resistance of the fabric for the main body lowers and, for compensating it, it has been necessary to increase the numbers of the reinforcing fabrics. The increase in the numbers of the reinforcing fabrics leads to complicated sewing and accordingly increase in the mass of the whole airbag. In view of these inconveniences, there has been a demand for a base fabric which can resist to thermal damage even if its using numbers are decreased.

Up to now, there has been used a coated fabric wherein a heat-resistant elastomer such as chloroprene rubber or silicone rubber is adhered to a woven fabric in an amount of 60 to 120 g/m$^2$ so as to resist to high-temperature gas which is instantly gushed from an inflator. Moreover, there has been also investigated a base fabric for an air bag wherein application liquid of elastomer resin is applied for plural times so as to form a plurality of layers, and wherein the total applied amount in terms of the elastomer resin is made 100 to 400 g/m$^2$ (for example, see Patent Document 1).

However, since the applied amount for this coated fabric is very much, although it is excellent in its heat resistance, the mass of the whole coated fabric increases and that is not preferred in view of making the weight light. In addition, the applied layer becomes hard and that is not preferred in terms of its storage as well. Moreover, when the applied amount is too much, there has been a problem of an increase in tackiness due to contact between the coat surfaces.

On the other hand, there have been investigated a base fabric for an air bag and also an air bag which use a non-coated base fabric for an air bag exhibiting excellent light weight and storing ability and which suppresses hole formation by high-temperature mist generated from an inflator (for example, see Patent Document 2).

To be more specific, the Patent Document 2 discloses a woven fabric having excellent resistance to melting wherein hole formation of a test piece by an anti-melting test is in grade two or higher. This fabric uses a single yarn having flat cross section and uses a synthetic fiber multifilament having total fineness of 400 to 700 dtex. In the above-mentioned anti-melting test, evaluation was conducted by placing a sample on a hot iron of 350° C. for five seconds. In this evaluating method however, there is a problem that the degree of heat-resistance property cannot be shown clearly in such a respect that a heated thing of high temperature is applied to a fabric for long time, as compared with the evaluating result for an air bag which actually uses an inflator gas of high temperature. Since a base fabric for an air bag is designed using an evaluating method having insufficient differentiation as such, a base fabric for an air bag prepared in the Patent Document 2 cannot be said to be sufficient in terms of heat resistance.

PRIOR ART DOCUMENTS

Patent Documents

Patent Document 1: Japanese Patent Application Laid-Open (JP-A) No. 2008-2003
Patent Document 2: Japanese Patent Application Laid-Open (JP-A) No. 2003-171843

DISCLOSURE OF THE INVENTION

Problem that the Invention is to Solve

An object of the present invention is to provide a coated fabric for an air bag which has a high heat resistance to such an extent that it can be used well for a reinforcing fabric, which has a heat resistance in such a level that it can be used for an inflator attachment port having high thermal load even in an applied amount of 60 g/m$^2$ or less and which prevents, at the same time, a blocking property caused by contact between the coated surfaces.

Means for Solving the Problem

The coated fabric for an air bag according to the present invention which can solve the above problem has the following constituent features.

Thus, the present invention relates to a coated fabric for an air bag obtained by applying an elastomer resin onto at least one side of a woven fabric made from synthetic fiber, characterized in that the applied amount of the elastomer resin is 25 to 60 g/m², that an average resin thickness on warp and weft at head top of the woven fabric surface is 8 μm to 45 μm, and that number of foams having diameter of 30 μm or larger is 100 or more/cm² on the surface of a resin layer.

The present invention also relates to a coated fabric for an air bag wherein the elastomer resin is a solvent-free silicone of an addition polymerization type.

Further, in a preferred embodiment of the present invention, the total fineness of yarns constituting the woven fabric is 350 to 1000 dtex, the cover factor of the woven fabric is 1,800 to 2,500 and the coated fabric is used as a heat-resistant reinforcing fabric.

The present invention also relates to a method for manufacturing a coated fabric for an air bag, characterized in that, application of the resin is not carried out for plural times and that, during drying after application of the resin, hot wind is irradiated from the upper side of the coated surface, namely only on one side of the woven fabric.

The present invention further relates to a method for manufacturing a coated fabric for an air bag, characterized in that, when a drying furnace is divided into halves of a former stage and a latter stage, dose of hot wind irradiated during drying after application of the resin is such a one that the dose of hot wind irradiated in the former stage is the same as or higher than the dose of hot wind irradiated in the latter stage.

Advantages of the Invention

The coated fabric for an air bag according to the present invention is excellent not only in its heat resistance but also in its preventing property for blocking caused by contact between the coated surfaces. Therefore, even when a pyroinflator receiving much thermal damage is used, damage of abase fabric for an air bag can be made small. Moreover, since the coated fabric according to the present invention also can be sufficiently used as a heat-resistant reinforcing fabric, it is not necessary to use by laminating a plurality of the fabrics unlike in the conventional case. Accordingly, it can be compactly stored whereby restriction in the in-car design can be made small.

BRIEF DESCRIPTION OF THE DRAWINGS

FIG. 1 is an illustrative drawing which shows the evaluating device and conditions used for the evaluation of absence or presence of hole formation in a heat-resistance test in the present invention.

FIG. 2 is a schematic drawing which shows an SEM picture of the surface of a coated fabric for an air bag according to the present invention.

FIG. 3 is an illustrative drawing which shows the position (an area with oblique lines) of the head top of a woven fabric surface seen from the cross section upon cutting at the broken-line areas in FIG. 2.

BEST MODE FOR CARRYING OUT THE INVENTION

The present invention will now be illustrated in detail as hereunder.
<Synthetic fiber woven fabric>
In the present invention, the woven fabric made from synthetic fiber means a woven fabric which is woven using synthetic fiber filament yarn. The woven fabric is excellent in mechanical strength and is excellent in such a respect that its thickness can be made thin. The weave of the woven fabric is not particularly limited and may be plain weave, twill weave, satin weave and variant weave thereof, multi-axial weave, etc. Among them, plain weave which is excellent in mechanical strength is particularly preferred.

With regard to the synthetic fiber, the particularly used ones thereof are aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate.

Besides the above, all-aromatic polyester fiber, poly-p-phenylenebenzobisoxazole fiber (PBO fiber), ultrahigh molecular polyethylene fiber, polyphenylene sulfide fiber, polyether ketone fiber, etc. can be used. However, when economy is taken into consideration, the polyester fiber and the polyamide fiber are preferred and the polyamide 6,6 is particularly preferred. In those fibers, a part of or all of them may be prepared from the recycled raw materials.

In the synthetic fibers as such, various kinds of additives may be contained therein for a purpose of enhancing the step passing property in the manufacturing step for starting yarn or the after-processing step. Examples of the additive used therefor include antioxidant, thermostabilizer, flattening/smoothening agent, antistatic agent, thickener and flame retardant. Further, the synthetic fiber may be a dope-dyed yarn or a yarn which is dyed after filature. Furthermore, the cross section of the single yarn may be not only the ordinary round cross section but also the differently shaped cross section. It is preferred to use multifilament yarn of 72 filaments or more for the synthetic fiber in view of softness and flatness/smoothness of the coated surface. Although there is no particular limitation for the upper limit, it is preferred to be not more than 216 filaments since the manufacture of yarn becomes difficult when filament numbers are too many. It is preferred when the fineness per single yarn of the resulting yarn is within a range of 0.1 to 10 dpf.

In the woven fabric of the present invention, amount of the oil adhered thereto is preferred to be not more than 0.2% by weight. When the adhered amount of the oil is more than 0.2% by weight, the adhesive property to silicone resin lowers. In addition, the numbers of foams existing on the surface of the coated layer extremely decrease since the amount of water contained in the woven fabric lowers. It is more preferably 0.15% by weight or less and further preferably 0.10% by weight or less. Although there is no particular limitation for the lower limit, it is not less than 0.005% by weight and more preferably not less than 0.01% by weight.

Coated Fabric

As to the resin for coating, preferred one is an elastomer resin having heat resistance, cold resistance and flame resistance and the most effective one is a silicone resin. Specific examples of the silicone resin include a silicone rubber of an addition polymerization type, etc. Examples of the silicone resin include dimethylsilicone rubber, methylvinylsilicone rubber, methylphenylsilicone rubber, trimethylsilicone rubber, fluorosilicone rubber, methylsilicone resin, methylphenylsilicone resin, methylvinylsilicone resin, epoxy-modified silicone resin, acrylic-modified silicone resin and polyester-modified silicone resin. Among them, the particularly suitable one is methylvinylsilicone rubber of an addition polymerization type which has rubber elasticity after curing, shows excellent strength and elongation and is advantageous in terms of cost.

When a silicone resin is used, it is also possible to use a reactive hardener. For example, there may be used a platinum type compound (such as platinum powder, platinic chloride or platinic tetrachloride), a palladium compound, a rhodium compound and an organic peroxide (such as benzoyl peroxide, p-chlorobenzoyl peroxide or o-chlorobenzoyl peroxide).

It is preferred that an adhesive aid is contained in the silicone resin for enhancing the adhesive property between the silicone rubber and the base fabric. Examples of the adhesive aid include at least one or more member(s) selected from the group consisting of amino-type silane coupling agent, epoxy-modified silane coupling agent, vinyl type silane coupling agent, chlorine-type silane coupling agent and mercapto-type silane coupling agent.

An inorganic filler to be added to the silicone rubber has been already used as a filler for a purpose of reinforcement of silicone rubber, adjustment of viscosity, enhancement of heat resistance, enhancement of flame retarding property, etc. The most representative filler is silica particles. Specific surface area of the silica particles is preferred to be not less than 50 $m^2/g$, more preferred to be 50 to 400 $m^2/g$ and further preferred to be 100 to 300 $m^2/g$. When the specific surface area is within this range, excellent tear strength is apt to be given to the resulting cured silicone. The specific surface area is measured by a BET method. One type of the silica particles maybe used solely or two or more thereof maybe used jointly. Examples of the silica particles used in the present invention include a natural one such as quartz, rock crystal, silica sand or diatomaceous earth and a synthetic one such as dry silica, silica fume, wet silica, silica gel or colloidal silica.

The above-mentioned silica particles are preferred to be hydrophobic silica particles obtained by subjecting the particle surface to a hydrophobic treatment with an organosilicon compound such as methylchlorosilane (e.g., trimethylchlorosilane, dimethyldichlorosilane and methyltrichlorosilane), dimethylpolysiloxane or hexaorganodisilazane (e.g., hexamethyldisilazane, divinyltetramethyldisilazane and dimethyltetravinyldisilazane) so as to apt to give better fluidity to the resin composition containing silicone rubber and additive.

Amount of the silica particles is preferred to be 10 to 20% by mass and more preferred to be 12 to 20% by mass to all of the silicone resin. When the amount of the silica particles is less than 10% by mass, the mechanical strength of the silicone rubber is apt to become low. On the other hand, when the amount of the silica particles is more than 20% by mass, fluidity of the resin composition is apt to become low resulting in deterioration of the coating work. In addition, the resin is apt to become brittle resulting in reduction of the adhesive property.

Resin viscosity of the elastomer resin used in the present invention is preferred to be 10,000 to 50,000 mPa·sec, more preferred to be 13,000 to 40,000 mPa·sec, and further preferred to be 20,000 to 35,000 mPa·sec. When the resin viscosity is lower than 10,000 mPa·sec, the resin comes into the inner area of the woven fabric whereby it is difficult to ensure the resin thickness necessary for securing the heat resistance. On the other hand, when the resin viscosity is higher than 50,000 mPa·sec, it is difficult to control the applied amount to 60 $g/m^2$ or less. Any of solvent type and solvent-free type ones may be used provided that adjustment to the above viscosity range is possible but, when the influence to the environment is taken into consideration, a solvent-free type one is suitable.

In the present invention, in the case of the resin composition containing an additive other than resin, viscosity of the resin composition is also defined as "viscosity of resin".

In the coated fabric of the present invention, it is an important constituent feature that the number of foams having diameter of 30 μm or more existing on the surface of the resin layer is 100 or more per $cm^2$ and preferably 130 or more per $cm^2$. Due to the existence of the foams as such, it is now possible to provide a coated fabric which is excellent in heat resistance and is hardly blocked even in an applied amount of 25 to 60 $g/m^2$. Although the upper limit is not particularly limited, it is preferred to be 300 or less per $cm^2$ and more preferred to be 250 or less per $cm^2$. When it is more than 300 per $cm^2$, exfoliation of the resin on the surface layer part is generated in a crease-flex test.

It has been known that, an air layer usually exhibits low thermal conductivity. As a result of the presence of many air layers due to foams in the resin layer, conductance of the heat in the resin layer can be made slow whereby it is also possible to use even in a reinforcing fabric in a pyro-inflator attachment port wherein heat resistance is particularly needed. Further, as the additional characteristic feature of the coated fabric for an air bag according to the present invention, it is now possible to prevent a blocking caused by contact between the coated surfaces even in an applied amount of 25 $g/m^2$ or more. This is because a lot of foams are present on the surfaces of coated fabric whereby unevenness is generated non-periodically seen from the cross-sectional direction and, as a result, the contacting area is reduced.

Although the air layer also can be formed from the air which is physically present in a coating agent, it can be formed by the water in the base fabric and, by the gas which is resulted in the reaction of a main agent of the silicone rubber with a silane coupling agent which is an auxiliary adhesive during thermal processing. When the coating and drying conditions are made into predetermined ones, it has been possible to adjust the foam numbers and to achieve the invention of the present application.

The present invention has a special technical characteristic feature particularly in such a respect that the following two inventive matters are satisfied at the same time.

(a) In the following heat resistance test, no hole is formed after irradiation of flame for 20 seconds.

(b) In the following blocking property test, no tackiness is noted after loading the weight at 100° C. for 500 hours.

(Heat Resistance Test) A coated fabric sample which is cut into a size of 15 cm×15 cm is held between big frames in a state wherein no looseness happens. After that, flame length of a gas burner is adjusted to 10 cm and the big frames holding the sample are set at the position which is 1 cm apart from the front end of the flame (Refer to FIG. 1.). The flame irradiated from the gas burner is previously adjusted using an adjusting valve for gas and air so that no red flame is generated and the temperature of the sample surface to which the flame is applied is made 450±20° C. as measured by an infrared thermometer. Then the coated fabric sample is irradiated with the flame for 20 seconds and it is confirmed whether hole is formed or not.

(Blocking Property Test)

The blocking stands for a tackiness degree when the coated surfaces are faced each other.

There are prepared three sets of coated fabric test pieces wherein each set comprises a pair of coated fabric samples each being cut out into a size of 50 mm×75 mm. The three sets of test pieces wherein coated surfaces are arranged inside are applied with a weight so as to apply a load of 35 gf/cm², placed horizontally in a drier adjusted to 100±2° C. and allowed to stand for 500 hours. Then they are taken out and, after removing the weight therefrom, they are allowed to cool in a room temperature environment for 30 minutes. After that, the test pieces are gently peeled off so as to confirm whether the tackiness is noted.

As a result of that "In the heat resistance test, no hole is formed after irradiation of flame for 20 seconds" as mentioned in the above (a), damage of a base fabric for an air bag can be made small even when a pyro-inflator is used. It has been known that, in a coated fabric wherein a hard coat of a silicone resin is formed, its heat resistance usually rises as the applied amount becomes more.

It has been however found that, when no hole is formed even after irradiation of the flame for 20 seconds in the heat resistance test mentioned in the above (a), no hole is formed due to the high-temperature mist generated from the inflator. It has been further found that, even when it is used as a heat-resistant reinforcing fabric to be used for an inflator attachment port to which much more heat is applied, no hole is formed due to high-temperature mist. The hole formation time in the heat resistance test is more preferred to be 30 seconds or longer.

As to a test method for "hole formation of a test piece by an anti-melting test" mentioned in the above Patent Document 2, there has been used a static evaluation method up to now wherein a sample is allowed to stand on the front part of a hot iron in which the surface temperature is adjusted at 350° C. However, the present inventors noticed that when an air bag is developed using a pyro-inflator, there is no big difference in the heat resistance property between a sample which formed hole in a test method for "hole formation of a test piece by an anti-melting test" and a sample which did not form any hole in the test. The reason therefor is likely to be due to the fact that the anti-melting test is an evaluation wherein a hot iron having metal front end is pushed onto a base fabric for several seconds and such test is greatly different from a phenomenon which causes in the actual development of an airbag wherein hot wind is applied onto a base fabric.

On the other hand, in the heat resistance test in the above (a) used in the present invention, surface temperature of the sample is adjusted to 450±20° C. Accordingly, when an air bag is developed using a pyro-inflator, a big difference is noted in the heat resistance property between a sample which formed hole in the test and a sample which did not form any hole in the test. This is likely to be due to fact that the temperature in initiating the decomposition of the silicone resin is generally at about 400° C.

As a result thereof, the present inventors have found that, when the surface temperature of the sample is adjusted to 450±20° C., there is a big difference due to the presence of foams in the resin layer. Then, they advantageously applied the finding to the material design for a silicone resin composition. Further, in view of the storability, it is possible to obtain a coated fabric having a slow heat conductivity and accordingly a high heat resistance property by making a lot of foams exist in the silicone resin layer even when the applied amount of the silicone resin composition is adjusted to as low as 25 to 60 g/m². Moreover, since it can be well used as a heat-resistant reinforcing fabric, there is no need of layering a plurality of fabrics as in the conventional cases whereby a compact storage is possible.

The expression reading "no tackiness is noted after loading the weight at 100° C. for 500 hours" in the above (b) is a yardstick for a blocking property showing whether non-uniform developing behavior is generated or not when an air bag which has been stored in a folded state for long time is developed. When no tackiness is noted in the evaluating temperature and time in this test, the blocking property is excellent whereby no non-uniform developing behavior due to unusual adhesion between the coated surfaces happens. If tackiness is found between the coated surfaces within 500 hours, there is a possibility that non-uniform developing behavior is noted when an air bag is quickly developed whereby the passengers are not appropriately protected.

Applied amount of the resin in a coated fabric for an air bag according to the present invention is preferred to be 25 to 60 g/m² and more preferred to be 30 to 50 g/m². When the applied amount of the resin is less than 25 g/m², thickness of the resin layer applied onto the surface of the woven fabric becomes low whereby the foams pass through the resin layer before the resin becomes hard. Therefore, the number of foams positioned on the surface extremely decreases. On the other hand, when the applied amount is more than 60 g/m², although the heat resistance can be secured, softness/flexibility of a coated woven fabric is deteriorated whereby not only the storage property is deteriorated but also the weight becomes high upon use as a main body fabric and also as a heat resistant reinforcing fabric.

Thickness of the resin of a coated fabric for an air bag according to the present invention is preferred to be 8 to 45 μm and more preferred to be 10 to 45 μm. When the resin thickness is less than 8 μm, thickness of the resin is thin and accordingly, it is not possible to make 100 or more per cm² of foams having diameter of 30 μm or more exist on the surface of the resin layer of the present invention whereby heat resistance is deteriorated. On the other hand, when the thickness is more than 45 μm, although the above numbers of foams can be achieved and the heat resistance becomes high, softness/flexibility of the coated fabric is deteriorated whereby not only the storage property is deteriorated but also the weight becomes high upon use as a main body fabric and also as a heat resistant reinforcing fabric.

Although the coated base fabric of the present invention may be a base fabric wherein both sides of the fabric are coated, it is more preferred to be a base fabric wherein only one side of the fabric is coated in view of a storage property.

As a method for applying the silicone resin in the present invention, a conventional and publicly known applying method is used. Examples of a coating method include knife coating, comma coating, die coating, gravure roll coating, kiss-roll coating, spraying method and Dip method.

In a continuous application of a silicone resin composition to a long-size base fabric by means of knife coating, it is preferred to control the tension of the base fabric in a direction of movement to an extent of 300 to 700 N/m and preferably to an extent of 400 to 650 N/m. When the tension of the base fabric is less than 300 N/m, selvage of the base fabric becomes bulky and big difference is resulted between the applied amounts to the central area and to the edge area whereby the thickness variation in the width direction becomes big. On the other hand, when the tension of the base fabric is more than 700 N/m, crimping rates in warp and weft are unbalanced and accordingly, it is difficult to maintain the applied amount within a specific range in both of the warp and weft directions whereby heat resistance lowers.

As a method for drying and hardening the coating agent after its application, there may be used a commonly used heating method such as hot wind, infrared ray or microwave. In view of the cost, a method by irradiation of hot wind has been widely used. With regard to the heating temperature and time, although there will be no problem therefor provided that the applied silicone resin reaches a temperature which is sufficient for hardening, it is preferred that the heating temperature is 150 to 200° C. and the heating time is 0.2 to 5 minute(s).

In order to obtain a coated fabric for an air bag of the present invention wherein 100 or more/cm$^2$ foams having diameter of 30 μm or longer exist on the resin layer, application times of the resin and method and dose of the hot wind irradiation during drying after application of the resin are very important.

Direction of hot wind irradiation shows from which direction the hot wind hits the coated base fabric and there are two types of direction which are a coated surface side and a non-coated surface side. Hot wind irradiation dose can be usually calculated by the following formula:

Hot wind irradiation dose (m$^3$/m$^2$)=Hot wind irradiation width (m)×Slit width (m)×Blowing-out direction of hot wind×Wind speed (m/s)×Time for passing through base fabric(s)÷Drying furnace area (m$^2$)

In order to obtain a coated fabric for an air bag according to the present invention, it is preferred that application of the resin is not carried out for plural times. When application of the resin is done for plural times, foams are made to exist not only on the surface but also in the inside. Accordingly, although the heat resistance becomes high, the numbers of foams remaining on the surface after the final application become small because a coating is done on the once-hardened coating agent. As a result, it is now difficult to satisfy a blocking property in addition to the heat resistance.

Moreover, in order to obtain a coated fabric for an air bag according to the present invention, it is desirable that the irradiation of hot wind for drying and hardening the coating agent after application of the resin is carried out from the upper side of the coated surface, namely only on one side of the woven fabric. By irradiating the hot wind only from the coated surface, hardening starts from the resin layer of the coated surface and accordingly, it is possible that the moisture generated from the base fabric confines the foams passing through the resin layer near the surface. When the irradiation of hot wind is carried out from the non-coated surface, foams existing in the inner area of the woven fabric pass through the resin layer before the hardening of the resin surface starts. Accordingly, the numbers of foams existing in the aimed resin surface layer greatly decrease whereby no high heat resistance is achieved.

Moreover, in order to obtain a coated fabric for an air bag according to the present invention, it is desirable that, with regard to the irradiation dose of hot wind for drying and hardening a coating agent after application of the resin, when the time period during which the fabric comes into a drying furnace and comes out therefrom is defined 100 and when the first 50 and the second 50 of the total required time are defined the former and the latter stages respectively, then the dose of hot wind irradiated in the former stage is the same as or higher than the dose of hot wind irradiated in the latter stage. When the irradiation dose of hot wind in the former stage is low as compared with that in the latter stage, the foams pass through the resin layer when the surface of the resin layer is hardened and the numbers of foams existing in the aimed resin surface layer greatly decrease whereby no high heat resistance is achieved. The irradiation dose ratio is more preferably 1.4-fold or more, and further preferably 2.4-fold or more. Incidentally, although the time period during which the fabric comes into a drying furnace and comes out therefrom may be decided by taking a hardening step of the resin in the conventional coating into consideration, it stands for the time period from a stage wherein a base fabric applied with a coating agent is placed into a furnace which imparts the heat quantity for hardening the coating agent until a stage wherein the base fabric in which the resin is hardened by heat comes out from the drying furnace.

The total fineness of the yarns constituting the woven fabric is preferred to be 350 to 1000 dtex. When the total fineness is more than 1000 dtex, the thickness of the base fabric increases whereby stiffness increases and accordingly, storage ability of air bag is deteriorated. On the other hand, when the total fineness is less than 350 dtex, strength of the air bag upon working such as tensile strength and tear strength of the coated fabric are apt to become insufficient.

Cover factor constituting the woven fabric is preferred to be 1,800 to 2,500 and more preferred to be 1,900 to 2,450. When the cover factor is less than 1,800, physical properties which are necessary for air bags (such as tensile strength and tear strength) are apt to become low. On the other hand, when the cover factor is more than 2,500, weaving becomes to be difficult and stiffness increases whereby storage ability is apt to be deteriorated. Incidentally, the cover factor CF can be calculated by the following formula:

CF=(Total fineness of warp)$^{1/2}$×(Density of warp)+ (Total fineness of weft)$^{1/2}$×(Density of weft)

Unit for the total fineness is dtex and that for the weaving density is (yarn numbers)/2.54 cm.

EXAMPLES

As hereunder, the present invention will be specifically illustrated by way of Examples although the present invention is not limited to those Examples. Incidentally, various evaluations in the Examples were done according to the following methods:

(1) Total Fineness

Total fineness was measured according to the method mentioned in JIS L-1095 9.4.1.

(2) Filament Number

Filament number was counted from the cross-sectional picture of the filament yarn.

(3) Weaving Density

Weaving density was measured according to the method mentioned in JIS L-1096 8.6.1.

(4) Applied Amount

Mass of the coated fabric was measured according to the method mentioned in JIS L-1096 8.4.2. After that, as a blank sample, the processing treatment was carried out under the same condition as the coated fabric except that the resin was not applied and then mass of the resulting blank sample was measured according to the method mentioned in JIS L-1096 8.4.2. After that, the difference between the mass of the coated fabric and the mass of the blank sample was calculated as the applied amount. Incidentally, applied amount (g/m$^2$) was expressed in terms of the mass (g) per 1 m$^2$. Incidentally, when only a coated fabric was present, mass of the woven fabric before coating was calculated by means of conversion from the used fineness and weaving density and then a coated amount was calculated from the difference in the mass between the above value and the mass of the coated fabric.

(5) Average Resin Thickness at Head Top of the Woven Fabric Surface

At the positions of the broken lines 5a and 5b shown in FIG. 2, the coated base fabric in randomly selected ten places being apart in 10 cm or more were cut using a razor and pictures of the cut surfaces were taken under an SEM. The pictures of cross sections as shown in FIG. 3 were taken in ten places in each of the warp and weft directions and the photographic pictures were printed on paper. After that, the resin existing on the upper surface of a fiber single yarn constituting the fabric was specified by naked eye from the printed cross sectional pictures. The width direction of the resin-applied area was equally divided into three, and the central part in the areas equally divided into three was regarded as a head top (refer to FIG. 3). Incidentally, the average resin thickness was calculated from the length of the paper corresponding to a resin part and the scale on the picture. Average resin thickness in the warp direction and that in the weft direction were calculated and then averaged. The average resin thickness was calculated down to the first decimal place followed by rounding off to the nearest first decimal place.

(6) Foam Numbers on the Surface

Test pieces in 1 cm×1 cm of outer size each were collected from randomly selected ten places being apart in 10 cm or more. Surface of a coated side was observed under an SEM of 50 magnifications and a photographic picture thereof was taken. Foams having diameter of 30 μm or more in the picture were counted and converted into the numbers per 1 $cm^2$. Mean value of the ten places was calculated as the foam numbers ($foams/cm^2$).

(7) Heat Resistance Test

A coated fabric sample cut into a size of 15 cm×15 cm was prepared. A hollow square frame made of metal was provided. Length of one side of the inner side of the frame was 13 to 15 cm. The coated fabric sample was allowed to stand thereon. Then a frame in the same size as the above metal frame was covered thereon. The sample was held between the frames in such a manner that no tension was applied to the sample. Then the frames were fixed in two places in such a manner that the coated fabric sample will not move even when the frame was vertically held. After that, flame length of a gas burner was adjusted to 10 cm and the frames holding the sample therein were set at the position which was 1 cm apart from the front end of the flame (Refer to FIG. 1.). The flame irradiated from the gas burner was previously adjusted using an adjusting valve for gas and air so that no red flame was generated and the temperature of the sample surface to which the flame was applied was made 450±20° C. as measured by an infrared thermometer. Then the flame was irradiated for 20 seconds to the coated side of the coated fabric. After 20 seconds, the sample was gently detached therefrom and, the sample after the irradiation was confirmed. When no hole was formed by heating, it was judged to pass the test while, when any hole was formed, it was judged not to pass the test.

(8) Blocking Property Test

Two coated fabric samples each being cut into a size of 50 mm×75 mm were layered in such a manner that the coated sides were arranged outside to prepare a set of test piece. Three sets of such test pieces were prepared in the same way. Then, the three sets of the test pieces were layered in such a manner that the coated surfaces were faced with each other and, a weight was placed thereon so as to apply a load of 35 $gf/cm^2$ followed by placed horizontally in a drier adjusted to 100±2° C. and by being allowed to stand for 500 hours. After that, the above was taken out, the weight was removed therefrom and the test pieces were allowed to cool for 30 minutes in a room temperature environment. After 30 minutes, the test piece existing in the upper side was moved up to an extent of 20 cm and, when the test piece in the lower side moves up to an extent of 20 cm at that time, it was judged not to pass the test while, when the lower side test piece did not move to such an extent at that time, it was judged to pass the test.

Example 1

Polyamide 66 multi-filament yarn comprising 144 filaments and having the total fineness of 940 dtex was woven by plain weave in a water jet loom. After that, the product was subjected to a shrinkage processing using boiling water and subjected to a dry finishing at 110° C. to give a woven fabric having the weaving density in the warp direction of 37 yarn numbers/2.54 cm, the weaving density in the weft direction of 37 yarn numbers/2.54 cm and the cover factor of 2,269.

After that, one side of this woven fabric was applied with a methyl vinyl silicone resin of an addition polymerization type for one time using a floating knife coater. In order to dry and harden the applied coating agent, only the coated surface side was subjected to a hot wind irradiation to harden at 200° C. for 2 minutes to give a coated base fabric having the applied amount of 44 $g/m^2$. At that time, the doses of hot wind irradiated in the former and the latter stages were made in the same level. Average thickness of the resin in the resulting coated fabric was 23 μm and number of the foams on the surface was 145/$cm^2$. Characteristic properties of this coated fabric were evaluated and shown in Table 1. The resulting coated fabric exhibited a high heat resistance and was excellent in a blocking property as well.

Example 2

The same operation as in Example 1 was conducted except that the applied amount of the resin after drying was adjusted to 35 $g/m^2$ whereupon a coated fabric for an air bag was prepared. Average thickness of the resin in the resulting coated fabric was 18 μm and number of the foams on the surface was 135/$cm^2$.

The resulting coated fabric exhibited, as shown in Table 1, a high heat resistance and was excellent in a blocking property as well.

Example 3

The same operation as in Example 1 was conducted except that, in a drying step after application of the resin for drying and hardening the coating agent, the ratio of dose of hot wind irradiated in the former stage to dose of hot wind irradiated in the latter stage was made 2.4 and that the applied amount of the resin after drying was adjusted to 26 $g/m^2$ whereupon a coated fabric for an air bag was prepared. Average thickness of the resin in the resulting coated fabric was 10 μm and number of the foams on the surface was 110/$cm^2$.

The resulting coated fabric exhibited, as shown in Table 1, a high heat resistance and was excellent in a blocking property as well.

Example 4

Polyamide 66 multi-filament yarn comprising 216 filaments and having the total fineness of 700 dtex was woven by plain weave in a water jet loom. After that, the product was subjected to a shrinkage processing using boiling water and subjected to a dry finishing at 110° C. to give a woven fabric having the weaving density in the warp direction of 43 yarn numbers/2.54 cm, the weaving density in the weft direction of 43 yarn numbers/2.54 cm and the cover factor of 2,275.

The same operation as in Example 1 was conducted except that, in a drying step after application of the resin for drying and hardening the coating agent, the ratio of dose of hot wind irradiated in the former stage to dose of hot wind irradiated in the latter stage was made 1.4 and that the applied amount of the resin after drying was adjusted to 35 g/m² whereupon a coated fabric for an air bag was prepared. Average thickness of the resin in the resulting coated fabric was 20 μm and number of the foams on the surface was 138/cm².

The resulting coated fabric exhibited, as shown in Table 1, a high heat resistance and was excellent in a blocking property as well.

Example 5

Polyamide 66 multi-filament yarn comprising 144 filaments and having the total fineness of 470 dtex was woven by plain weave in a water jet loom. After that, the product was subjected to a shrinkage processing using boiling water and subjected to a dry finishing at 110° C. to give a woven fabric having the weaving density in the warp direction of 46 yarn numbers/2.54 cm, the weaving density in the weft direction of 46 yarn numbers/2.54 cm and the cover factor of 1,995.

The same operation as in Example 1 was conducted except that the applied amount of the resin after drying was adjusted to 59 g/m² whereupon a coated fabric for an air bag was prepared. Average thickness of the resin in the resulting coated fabric was 44 μm and number of the foams on the surface was 250/cm².

The resulting coated fabric exhibited, as shown in Table 1, a high heat resistance and was excellent in a blocking property as well.

Example 6

Polyamide 66 multi-filament yarn comprising 108 filaments and having the total fineness of 350 dtex was woven by plain weave in a water jet loom. After that, the product was subjected to a shrinkage processing using boiling water and subjected to a dry finishing at 110° C. to give a woven fabric having the weaving density in the warp direction of 55 yarn numbers/2.54 cm, the weaving density in the weft direction of 55 yarn numbers/2.54 cm and the cover factor of 2,058.

The same operation as in Example 1 was conducted except that the applied amount of the resin after drying was adjusted to 45 g/m² whereupon a coated fabric for an air bag was prepared. Average thickness of the resin in the resulting coated fabric was 29 μm and number of the foams on the surface was 162/cm².

The resulting coated fabric exhibited, as shown in Table 1, a high heat resistance and was excellent in a blocking property as well.

Example 7

Polyester multi-filament yarn comprising 72 filaments and having the total fineness of 425 dtex was woven by plain weave in a water jet loom. After that, the product was subjected to a shrinkage processing using boiling water and subjected to a dry finishing at 110° C. to give a woven fabric having the weaving density in the warp direction of 55 yarn numbers/2.54 cm, the weaving density in the weft direction of 55 yarn numbers/2.54 cm and the cover factor of 2,268.

The same operation as in Example 1 was conducted except that, in a drying step after application of the resin for drying and hardening the coating agent, the ratio of dose of hot wind irradiated in the former stage to dose of hot wind irradiated in the latter stage was made 2.4 and that the applied amount of the resin after drying was adjusted to 35 g/m² whereupon a coated fabric for an air bag was prepared. Average thickness of the resin in the resulting coated fabric was 22 μm and number of the foams on the surface was 105/cm².

The resulting coated fabric exhibited, as shown in Table 1, a high heat resistance and was excellent in a blocking property as well.

Comparative Example 1

The same operation as in Example 1 was conducted except that irradiation of hot wind was conducted from both sides, namely from the coated and the non-coated surfaces for drying and hardening the coating agent and that the applied amount of the resin after drying was adjusted to 45 g/m² whereupon a coated fabric for an air bag was prepared. Average thickness of the resin in the resulting coated fabric was 25 μm and number of the foams on the surface was 86/cm².

As shown in Table 1, the resulting coated fabric was inferior in the heat resistance and the blocking property.

Comparative Example 2

The same operation as in Example 1 was conducted except that, in a drying step after application of the resin for drying and hardening the coating agent, the ratio of dose of hot wind irradiated in the former stage to dose of hot wind irradiated in the latter stage was made 2.4 and that the applied amount of the resin after drying was adjusted to 20 g/m² whereupon a coated fabric for an air bag was prepared. Average thickness of the resin in the resulting coated fabric was 7 μm and number of the foams on the surface was 55/cm².

As shown in Table 1, the resulting coated fabric was extremely inferior in the heat resistance and the blocking property.

Comparative Example 3

The same operation as in Example 5 was conducted except that, in a drying step after application of the resin for drying and hardening the coating agent, the ratio of dose of hot wind irradiated in the former stage to dose of hot wind irradiated in the latter stage was made 0.8 and that the applied amount of the resin after drying was adjusted to 46 g/m² whereupon a coated fabric for an air bag was prepared. Average thickness of the resin in the resulting coated fabric was 28 μm and number of the foams on the surface was 72/cm².

As shown in Table 1, the resulting coated fabric was inferior in the heat resistance and the blocking property.

Comparative Example 4

The same operation as in Example 6 was conducted except that the resin application was done in the same applying method as in Example 6 but for two times, namely in 36 g/m² in the first run and the same surface was applied with 26 g/m² in the second run whereupon a coated fabric for an air bag wherein the total applied amount was adjusted to 62 g/m² was prepared. Average thickness of the resin in the resulting coated fabric was 47 μm and number of the foams on the surface was 20/cm².

As shown in Table 1, the resulting coated fabric was excellent in the heat resistance while it was extremely inferior in the blocking property.

TABLE 1

|  | Unit | Example 1 | Example 2 | Example 3 | Example 4 |
|---|---|---|---|---|---|
| Fiber material | — | polyamide 66 | polyamide 66 | polyamide 66 | polyamide 66 |
| Total fineness | dtex | 940 | 940 | 940 | 700 |
| Filament number | filament | 144 | 144 | 144 | 216 |
| Weaving density (warp/weft) | (yarn numbers)/2.54 cm | 37/37 | 37/37 | 37/37 | 43/43 |
| Cover factor | — | 2,269 | 2,269 | 2,269 | 2,275 |
| Resin application time | time | 1 | 1 | 1 | 1 |
| Hot wind irradiation surface | — | only from the upper side of the coated surface | only from the upper side of the coated surface | only from the upper side of the coated surface | only from the upper side of the coated surface |
| Hot wind irradiation dose former stage/latter stage ratio | — | 1.0 | 1.0 | 2.4 | 1.4 |
| Total applied amount of the resin | g/m$^2$ | 44 | 35 | 26 | 35 |
| Average resin thickness at head top of the woven fabric surface | μm | 23 | 18 | 10 | 20 |
| Number of foams on the surface | per cm$^2$ | 145 | 135 | 110 | 138 |
| Heat resistance | — | pass the test | pass the test | pass the test | pass the test |
| Blocking property | — | pass the test | pass the test | pass the test | pass the test |

|  | Unit | Example 5 | Example 6 | Example 7 |
|---|---|---|---|---|
| Fiber material | — | polyamide 66 | polyamide 66 | polyester |
| Total fineness | dtex | 470 | 350 | 425 |
| Filament number | filament | 144 | 108 | 72 |
| Weaving density (warp/weft) | (yarn numbers)/2.54 cm | 46/46 | 55/55 | 55/55 |
| Cover factor | — | 1,995 | 2,058 | 2,268 |
| Resin application time | time | 1 | 1 | 1 |
| Hot wind irradiation surface | — | only from the upper side of the coated surface | only from the upper side of the coated surface | only from the upper side of the coated surface |
| Hot wind irradiation dose former stage/latter stage ratio | — | 1.0 | 1.0 | 2.4 |
| Total applied amount of the resin | g/m$^2$ | 59 | 45 | 35 |
| Average resin thickness at head top of the woven fabric surface | μm | 44 | 29 | 22 |
| Number of foams on the surface | per cm$^2$ | 250 | 162 | 105 |
| Heat resistance | — | pass the test | pass the test | pass the test |
| Blocking property | — | pass the test | pass the test | pass the test |

|  | Unit | Comparative Example 1 | Comparative Example 2 | Comparative Example 3 | Comparative Example 4 |
|---|---|---|---|---|---|
| Fiber material | — | polyamide 66 | polyamide 66 | polyamide 66 | polyamide 66 |
| Total fineness | dtex | 940 | 940 | 470 | 350 |
| Filament number | filament | 144 | 144 | 144 | 108 |
| Weaving density (warp/weft) | (yarn numbers)/2.54 cm | 37/37 | 37/37 | 46/46 | 55/55 |
| Cover factor | — | 2,269 | 2,269 | 1,995 | 2,058 |
| Resin application time | time | 1 | 1 | 1 | 2 |
| Hot wind irradiation surface | — | from both of the coated and non-coated surfaces | only from the upper side of the coated surface | only from the upper side of the coated surface | only from the upper side of the coated surface |
| Hot wind irradiation dose former stage/latter stage ratio | — | 1.0 | 2.4 | 0.8 | first run: 1.0 second run: 1.0 |
| Total applied amount of the resin | g/m$^2$ | 45 | 20 | 46 | 62 |
| Average resin thickness at head top of the woven fabric surface | μm | 25 | 7 | 28 | 47 |
| Number of foams on the surface | per cm$^2$ | 86 | 55 | 72 | 20 |
| Heat resistance | — | not to pass the test | not to pass the test | not to pass the test | pass the test |
| Blocking property | — | not to pass the test | not to pass the test | not to pass the test | not to pass the test |

INDUSTRIAL APPLICABILITY

The coated fabric for an air bag according to the present invention is excellent not only in its heat resistance but also in its preventing property for blocking caused by contact between the coated surfaces. Therefore, even when a pyro-inflator receiving much thermal damage is used, damage of a base fabric for an air bag can be made small. Moreover, since the coated fabric according to the present invention also can be sufficiently used as a heat-resistant reinforcing fabric, it is not necessary to use by laminating a plurality of the fabrics unlike in the conventional case. Accordingly, it can be compactly stored whereby restriction in the in-car design can be made small. Consequently, the present invention greatly contributes to the industry.

EXPLANATION OF REFERENCE NUMBER

1: Gas burner
2: Flame
3: Samples
4: Coated base fabric
4a: warp direction
4b: weft direction 5a: cut position on head top of woven fabric (cut position of warp)

5b: cut position on head top of woven fabric (cut position of weft)

6: Head top of woven fabric

The invention claimed is:

1. A coated fabric for an air bag obtained by applying an elastomer resin onto at least one side of a woven fabric made from synthetic fiber, wherein the applied amount of the elastomer resin is 25 to 60 g/m$^2$, the average resin thickness on warp and weft at head top of the woven fabric surface is 8 μm to 45 μm, and the number of cells having diameter of 30 μm or larger is 100 or more per 1 cm$^2$ on the surface of the resin.

2. The coated fabric for an air bag according to claim 1, wherein the elastomer resin is a solvent-free silicone of an addition polymerization type.

3. The coated fabric for an air bag according to claim 1, wherein the total fineness of yarns constituting the woven fabric is 350 to 1000 dtex.

4. The coated fabric for an air bag according to claim 1, wherein the cover factor of the woven fabric is 1,800 to 2,500.

5. The coated fabric for an air bag according to claim 1, which is a heat-resistant reinforcing fabric.

6. A method for manufacturing the coated fabric for an air bag according to claim 1, comprising a step of applying an elastomer resin onto at least one side of a woven fabric made from synthetic fiber, wherein, during drying after application of the resin, hot wind is irradiated from the upper side of the coated surface.

7. The method for manufacturing a coated fabric for an air bag according to claim 6, wherein, a drying furnace is divided into halves of a former stage and a latter stage, and during drying after application of the resin, the dose of hot wind irradiated in the former stage is the same as or higher than the dose of hot wind irradiated in the latter stage.

* * * * *